W. F. KEHOE.
NUT LOCK.
APPLICATION FILED JULY 19, 1910.
1,007,706.
Patented Nov. 7, 1911.
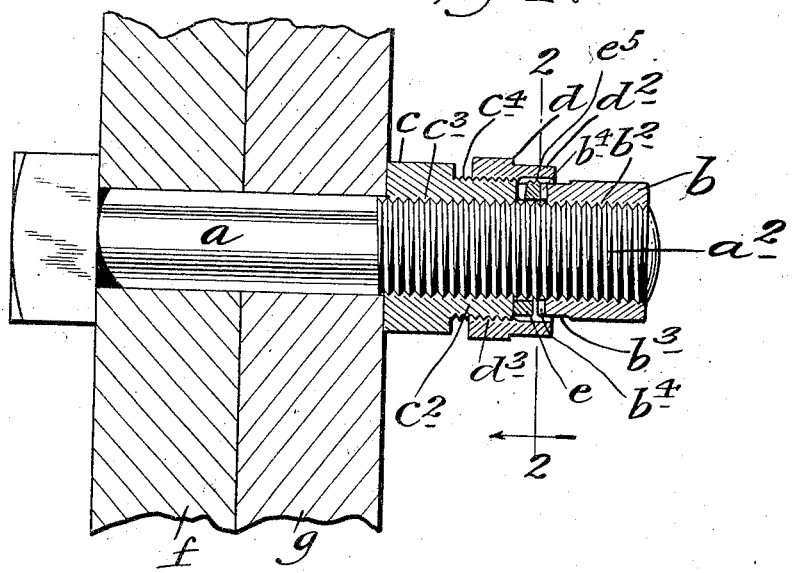
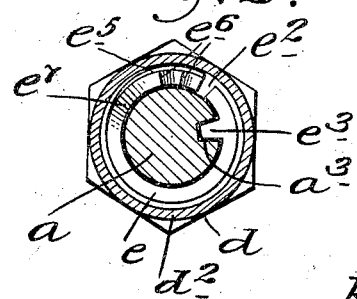
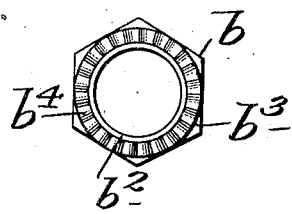
WITNESSES:
A. R. Appleman
R. M. Ryerson
INVENTOR
William F. Kehoe.
BY Edgar Tate & Co.
ATTORNEYS.

UNITED STATES PATENT OFFICE.

WILLIAM F. KEHOE, OF BABYLON, NEW YORK.

NUT-LOCK.

1,007,706.　　　　Specification of Letters Patent.　　Patented Nov. 7, 1911.

Application filed July 19, 1910. Serial No. 572,694.

*To all whom it may concern:*

Be it known that I, WILLIAM F. KEHOE, a citizen of the United States, and residing at Babylon, in the county of Suffolk and State of New York, have invented certain new and useful Improvements in Nut-Locks, of which the following is a specification, such as will enable those skilled in the art to which it appertains to make and use the same.

This invention relates to nut locks, and the object thereof is to provide an improved device of this class which is designed for use in connection with fish plates in coupling railway rails, and also in most other places where devices of this class are required.

The invention is fully disclosed in the following specification, of which the accompanying drawing forms a part, in which the separate parts of my improvement are designated by suitable reference characters in each of the views, and in which:—

Figure 1 is a sectional side view showing my improved nut lock device and the method of its operation; Fig. 2 a transverse section on the line 2—2 of Fig. 1; Fig. 3 an end view of a nut which I employ, and;—Fig. 4 a plan view of an open nut lock ring which forms a part of my invention.

In the practice of my invention I provide a bolt $a$ of the usual or any preferred form and dimensions, and one end of said bolt is threaded as shown at $a^2$, and mounted thereon is a nut $b$. I also provide a jam nut $c$ having a reduced extension at $c^2$. The thread $a^2$ of the bolt $a$, the thread $b^2$ of the nut $b$ and the thread $c^3$ of the nut $c$ are right threads, but the reduced extension $c^2$ of the nut $c$ is provided with a left thread $c^1$, and mounted thereon is a supplemental nut $d$ which is also provided with a left thread which engages the thread $c^4$, and the nut $d$ is provided with an extension $d^2$, the inner diameter of which is larger than the diameter of the extension $c^2$ of the nut $c$, and the inner end portion $b^3$ of the nut $b$ is of such size as to enter the extension $d^2$ of the nut $d$. I also provide an open lock nut ring $e$ which is adapted to be passed on over the threaded end portion $a^2$ of the bolt $a$ before the nut $b$ is screwed thereonto and after the jam nut $c$ has been screwed into position and also after the supplemental nut $d$ has been screwed onto the jam nut $c$.

The lock nut ring $e$ is open at one side as shown at $e^2$ and is provided with an inwardly directed lug $e^3$ adapted to fit in a longitudinal groove $a^3$ in the bolt $a$, and one end portion of the ring $e$ is offset or outset tangentially as shown at $e^4$, and said offset or outset portion is provided with spirally arranged sectional threads $e^5$, and the outer side face thereof with one or more teeth $e^6$.

The inner end of the nut $b$ is provided with ratchet teeth $b^4$, and in the use of this device the jam nut $c$ is first screwed into position, the supplemental nut is then screwed onto the jam nut, the open ring $e$ is then passed on over the end of the bolt and into the extension $d^2$ of the nut $d$, after which the nut $b$ is screwed into position. As the nut $b$ is screwed fully home the beveled sides of the ratchet teeth $b^4$ strike the beveled sides of the teeth $e^6$ on the ring $e$, and the offset or outset end portion $e^4$ of the said ring is forced backwardly slightly and the teeth $e^6$ of said ring engage the teeth $b^4$ of the nut $b$, and said nut can not be turned in the reversed direction and can not work loose or come off of the bolt $a$.

Whenever it is desired to remove the nut $b$ the supplemental nut $d$ is turned until the threads $d^3$ thereof engage the threads $e^5$ of the ring $e$, and as the turning of the nut $d$ continues the offset or outset end portion $e^4$ of said ring will be drawn farther back or inwardly until the teeth $e^6$ thereof disengage the teeth $b^4$ of the nut $b$ at which time said nut $b$ may be removed from the bolt $a$.

The extension $d^2$ of the nut $d$ forms a cap or cover for the ring $e$ and prevents dust and dirt from working in between said ring and the nuts $b$, $c$, and $d$, and any suitable lubricating material may also be placed in the spaces around the ring $e$ to prevent the said nuts and the ring $e$ from rusting.

Formed in the outer face of the ring $e$ at a predetermined distance from the offset or outset end portion thereof is a recess $e^7$, and if at any time the nut $d$ should fail to operate as hereinbefore described said nut may be turned back on the nut $c$ until the offset or outset end portion of the ring $e$ is uncovered and a wedge may be driven into the recess $e^7$ and between said ring and the nut $b$, after which said nut may be turned off of the bolt $a$ by means of a wrench or in the usual manner. In Fig. 1 of the accompanying drawing I have also shown at $f$ and $g$ two work pieces, or parts, connected by the bolt $a$ but it will be understood that my improved nut lock may be employed wherever such devices are required.

Having fully described my invention, what I claim as new and desire to secure by Letters Patent, is:—

1. A bolt provided with an ordinary nut and a jam nut, the jam nut being provided with an extension, and the ordinary nut being provided on its inner face with ratchet teeth, a supplemental nut screwed on to the extension of the jam nut, and provided with an enlarged extension adapted to receive the adjacent end of the ordinary nut and an open ring adapted to be passed on over the bolt before the ordinary nut is screwed thereonto, and which is inclosed by the extension of the supplemental nut, one end portion of said ring being offset in the direction of the ordinary nut and provided with ratchet teeth adapted to engage the teeth on said nut, and the offset end portion of said ring being provided with spiral threads and said ring and bolt being provided with means to prevent the ring from turning on the bolt.

2. The combination with a threaded bolt, of a jam nut being provided with an extension, a supplemental nut mounted on said extension and provided with an enlarged end adapted to receive the adjacent end of the ordinary nut, an open ring adapted to be passed on over the bolt before the ordinary nut is screwed into position, one end portion of the open ring being offset and said offset end portion of said ring in the ordinary nut being provided with corresponding ratchet teeth, said ring and bolt being provided with means to prevent the ring from turning on the bolt and said bolt, nuts and ring being threaded substantially as described.

In testimony that I claim the foregoing as my invention I have signed my name in presence of the subscribing witnesses this 18th day of July 1910.

WILLIAM F. KEHOE.

Witnesses:
C. C. MULREANY,
A. R. APPLEMAN.